United States Patent
Salihi et al.

[15] 3,688,171
[45] Aug. 29, 1972

[54] INDUCTION MOTOR BRAKING SYSTEM

[72] Inventors: Jalal T. Salihi, Birmingham; John J. Brockman, Southfield; George J. Spix, Clawson, all of Mich.

[73] Assignee: General Motors Corporation, Detroit, Mich.

[22] Filed: Aug. 13, 1971

[21] Appl. No.: 171,464

[52] U.S. Cl. ............... 318/211, 318/227, 318/230, 318/231, 318/376
[51] Int. Cl. ............................................. H02p 3/22
[58] Field of Search ...... 318/209, 211, 227, 230, 231, 318/375, 376

[56] References Cited

UNITED STATES PATENTS

| | | | |
|---|---|---|---|
| 3,153,182 | 10/1964 | Choudhury | 318/211 |
| 3,293,520 | 12/1966 | Lehry | 318/227 |
| 3,590,351 | 6/1971 | Littwin | 318/211 |

*Primary Examiner*—Gene Z. Rubinson
*Attorney*—E. W. Christen et al.

[57] ABSTRACT

A braking system for a polyphase induction motor fed from a source of alternating current through a controlled rectifier converter having a variable output frequency. A control system is provided which is capable of controlling the output frequency of the converter relative to the rotor speed of the motor such that the motor can be operated with either a positive or a negative slip frequency. When it is desired to brake the motor it is operated at a negative slip frequency and braking resistors are connected across the phase windings of the motor. In addition the negative slip frequency is varied during the braking mode of operation as a function of induction motor rotor speed. The system is capable of reducing the conduction angle of the controlled rectifier converter during braking and is capable of connecting in different valued braking resistors for different speed ranges of the motor. The braking system is disclosed herein for use with a vehicle propelled by an induction motor and more particularly an induction motor powered off-highway earthmover.

10 Claims, 7 Drawing Figures

INVENTORS
Jalal J. Salihi,
John J. Brockman &
George J. Spix
BY
C. R. Meland
ATTORNEY

INDUCTION MOTOR BRAKING SYSTEM

This invention relates to electrical braking of an induction motor and more particularly to a system for braking an induction motor powered vehicle such as an earthmover.

A well known characteristic of an induction motor is that if the machine is operated such that the rotor speed exceeds the synchronous speed of the motor as dictated by the frequency of the applied voltage the induction machine will operate as an induction generator and consequently will apply a braking force to the rotor of the motor. During this braking mode of operation the induction machine is operating with a negative slip frequency since the frequency related to rotor speed is higher than the frequency of the applied voltage.

Induction motor control systems having been devised where the slip frequency of the system is controlled and where the slip frequency is made negative to cause the motor to operate as a generator and therefore in a braking mode. In these systems energy has been returned to the voltage source through the frequency control device connecting the voltage source and the motor. An example of a system that uses negative slip frequency for braking is disclosed in the patent to Lehry U.S. Pat. No. 3,293,520.

Induction motor braking systems have also been devised where braking is accomplished by disconnecting the power source from the motor, connecting capacitors with the phase windings of the motor to cause the motor to regenerate and subsequently connecting resistors with the phase windings. Such a braking system is disclosed in the patent to Choudhury U.S. Pat. No. 3,153,182.

In contrast to the just mentioned braking systems it is an object of this invention to provide an induction motor braking system wherein the induction machine is operated at a negative slip frequency to initiate braking but wherein power is not returned to the power source during braking. Instead of returning power to the voltage source resistors are connected across the phase windings of the motor when it is operated at a negative slip frequency. In addition the negative slip frequency is varied as a function of rotor speed to maintain a predetermined relationship between the impedance of the induction machine and the braking resistor to thereby provide optimum braking. With this arrangement the triggering of the converter connecting the power source and the motor is simplified since power need be transferred in only one direction. The system nevertheless provides either a braking or power mode of operation for the motor with control of slip frequency either positive or negative.

Another object of this invention is to provide a braking system of the type described wherein the induction motor is supplied from a source of alternating current through a controlled rectifier converter and wherein the conduction angle of the controlled rectifiers of the converter are reduced during the braking mode of operation. As an example, the conduction angle may be reduced from 120° for power operation to 60° for braking operation.

A further object of this invention is to provide a braking system for an induction motor where the motor is supplied with power from a source of alternating current through a converter that has a substantially square wave output and which is not capable of returning power to the source. In carrying this object forward the motor is operated with a negative slip frequency and braking resistors are connected across the phase windings of the motor. The negative slip frequency is varied as a function of motor speed and no power is returned to the source of alternating current during the braking operation.

Still another object of this invention is to provide a braking system of the type described wherein the voltage applied to the motor is controlled during the negative slip braking mode. Where the system is powered by an alternating current generator the field current of the generator is controlled during braking to control the voltage applied to the induction machine which is then operating as a generator.

A further object of this invention is to provide a braking system for an induction motor powered vehicle such as an earthmover. In carrying this object forward the vehicle is provided with a manually operable braking control which when operated by the vehicle operator shifts the induction motor from a power mode to a braking mode. Actuation of the braking control by the operator causes the motor to operate with a negative slip, switches in the braking resistors and causes the negative slip to vary as a function of rotor speed.

Still another object of this invention is to provide an induction motor braking system of the type described wherein the resistance value of the braking resistors is varied for different speed ranges of the motor. In addition the system includes means for providing different negative slip frequency motor speed functions for the different speed ranges matched to the resistance value of the braking resistance.

The induction motor braking system of this invention will be described in conjunction with an electrically propelled vehicle and more particularly an electrically propelled earthmover. It is to be understood, however, that the braking system of this invention could be used in other environments and may for example be used in a plant or factory where a commercial source of alternating current is available.

Figure 1:
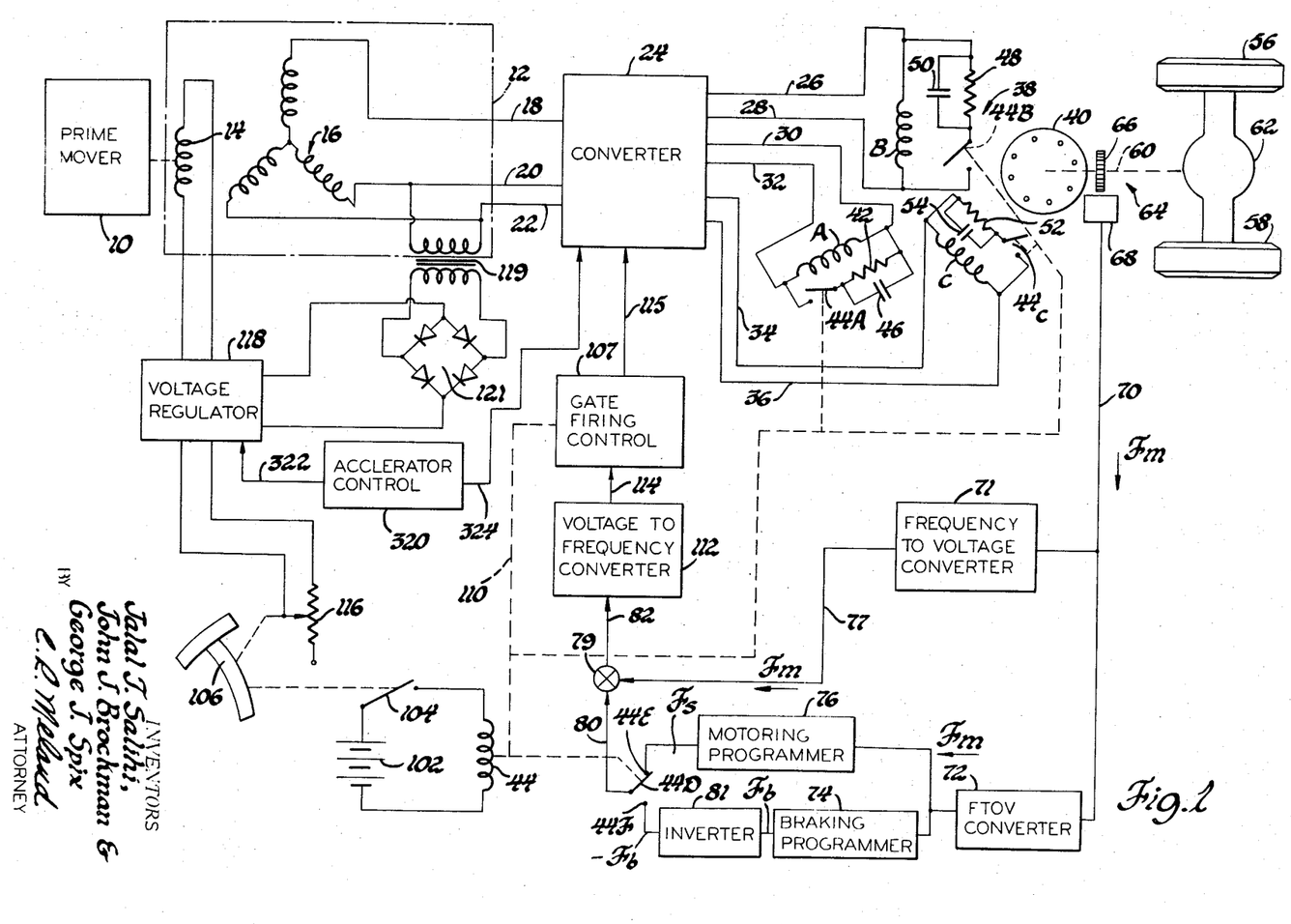
FIG. 1 is a system diagram of an induction motor power and braking system made in accordance with this invention.

Referring now to the drawings and more particularly to FIG. 1, a braking system for an induction motor made in accordance with this invention is illustrated for use with an electrically propelled vehicle. In FIG. 1 the reference numeral 10 indicates a prime mover of a motor vehicle which may be for example a diesel engine or a turbine. The output shaft of the prime mover 10 is coupled to the rotor of an alternating current generator which is generally designated by reference numeral 12. The rotor in FIG. 1 is illustrated as a field winding 14 which is suitably wound on the rotor of the alternating current generator 12 and which as will become more apparent hereinafter controls the output voltage of the alternator 12 when the field current in the field winding 14 is varied. The alternator may be of the brushless type if desired in which case the field 14 would be fixed. The alternating current generator 12 has a three-phase Y-connected output winding designated by reference numeral 16 and this winding may be wound on a suitable stator core as is well known to those skilled in the art.

The three-phase Y-connected output winding 16 is connected with power supply conductors designated by reference numerals 18, 20 and 22. These power supply conductors 18, 20 and 22 are connected with a converter which is generally designated by reference numeral 24 and which is illustrated in detail in FIG. 2. The converter 24 is comprised of 36 controlled rectifiers which operate to convert the alternating current appearing at conductors 18, 20 and 22 to square wave alternating current (FIG. 3) which is applied to phase windings of an induction motor. To this end the output conductors of the converter are connected respectively with conductors 26, 28, 30, 32, 34 and 36. The output conductors that have just been described feed the phase windings of a three-phase Y-connected induction motor which is generally designated by reference numeral 38. The phase windings of the induction motor 38 are designated by the letters A, B and C. It can be seen that conductors 26 and 28 feed the phase winding B, conductors 30 and 32 feed the phase winding A and conductors 34 and 36 feed the phase winding C. The induction motor 38 has a squirrel cage rotor which is designated by reference numeral 40.

When it is desired to operate the induction motor as a brake, a braking resistor designated by reference numeral 42 is connected in parallel with the phase winding A through a relay controlled switch designated by reference numeral 44A. The relay controlled switch 44A is controlled by a relay coil designated by reference numeral 44 which will be described in more detail hereinafter. The resistor 42 is paralleled by a capacitor designated by reference numeral 46. In a similar fashion the phase winding B is connected in parallel with a braking resistor 48 which is connected across a capacitor 50 and in series with relay controlled contact 44B. The phase winding C in a similar manner is paralleled by braking resistor 52, capacitor 54 and relay controlled switch designated by reference numeral 44C. As will become more readily apparent hereinafter, the relay controlled switches 44A, 44B and 44C are all closed when it is desired to operate the induction motor 38 in a braking mode.

The squirrel cage rotor 40 of the induction motor is coupled to the drive wheels 56 and 58 of the vehicle by a shaft 60 and a differential designated by reference numeral 62. The drive wheels 56 and 58 may be for example a pair of wheels on an articulated earthmover. The other pair of wheels on such an earthmover (not illustrated) may be driven through another induction motor connected with another converter fed from the alternating current generator.

The motor control system of this invention is capable of controlling the slip frequency of the induction motor 38 and is capable of providing a positive slip frequency for motoring operation and a negative slip frequency when it is desired to brake the induction motor and slow down the earthmover. To this end the motor control system is provided with a magnetic pickup device generally designated by reference numeral 64 for sensing the speed of rotation of the rotor 40 of the induction motor. This magnetic pickup device 64 comprises a toothed wheel designated by reference numeral 66 and a pickup coil which is designated by reference numeral 68. The voltage generator or magnetic pickup 64 is arranged such that a series of voltage pulses are induced in the pickup coil 68, the frequency of which is a function of the speed of rotation of the rotor 40. The voltage pulses developed in coil 68 are applied to a conductor 70 and the frequency of these voltage pulses is designated by the letter $F_m$. The frequency of these voltage pulses are used in determining the slip frequency of the induction motor 38 as will be explained. The voltage pulses on line 70 are applied to a pair of frequency-to-voltage converters which are designated by reference numerals 71 and 72. These frequency-to-voltage converters may take any well known form which is capable of developing a direct output voltage, the amplitude of which is a function of the frequency of the voltage pulses applied thereto from line 70. The direct voltage output of the frequency-to-voltage converter 72 is applied to a braking control device or braking slip programmer designated by reference numeral 74 and is also applied to a motor slip programmer designated by reference numeral 76. It therefore will be apparent that a direct voltage is applied to the braking control device 74 and to the motoring programmer 76 the magnitude of which is a function of the speed of rotation of the rotor 40 of the induction motor and this voltage is designated as $F_m$.

The voltage $F_m$, the magnitude of which is a function of induction motor rotor speed, is combined with either a positive voltage or a negative voltage to provide either a controlled positive slip frequency or a negative slip frequency for the braking mode of operation of the induction motor 38. In order to accomplish this the conductor 77 which has a direct voltage $F_m$ (rotor speed) applied thereto is applied to a direct voltage adder-subtractor 79.

The adder-subtractor 79 has another input from line 80 which is connected with a movable contact 44D of a relay operated switch controlled by relay coil 44. This switch has a fixed contact 44E connected with the output of motoring programmer 76 and a fixed contact 44F connected with the output of an inverter 81 connected between contact 44F and braking programmer 74.

With contact 44D engaging contact 44E as shown in FIG. 1 the system is set to provide motoring operation. The system is arranged such that under this condition of operation a positive voltage $F_s$ from motoring programmer 76 will be added to a positive voltage $F_m$ on conductor 77 with the result that a direct voltage $F_m + F_s$ appears at the output of adder-subtractor 79 on conductor 82. This voltage $F_m + F_s$ on conductor 82 will set the switching frequency of converter 24 to set the positive slip frequency of motor 38 in a manner to be more fully described hereinafter.

When movable contact 44D engages fixed contact 44F the system is set for the braking mode of operation. The output voltage of braking programmer 74 is inverted by inverter 81 and a negative voltage $F_b$ is now combined (algebraic sum) with positive voltage $F_m$ in adder-subtractor 79 with the result that a voltage $F_m - F_b$ is applied to line 82. This causes the motor to operate with a negative slip frequency to cause the motor to operate in a braking mode.

Figure 4:
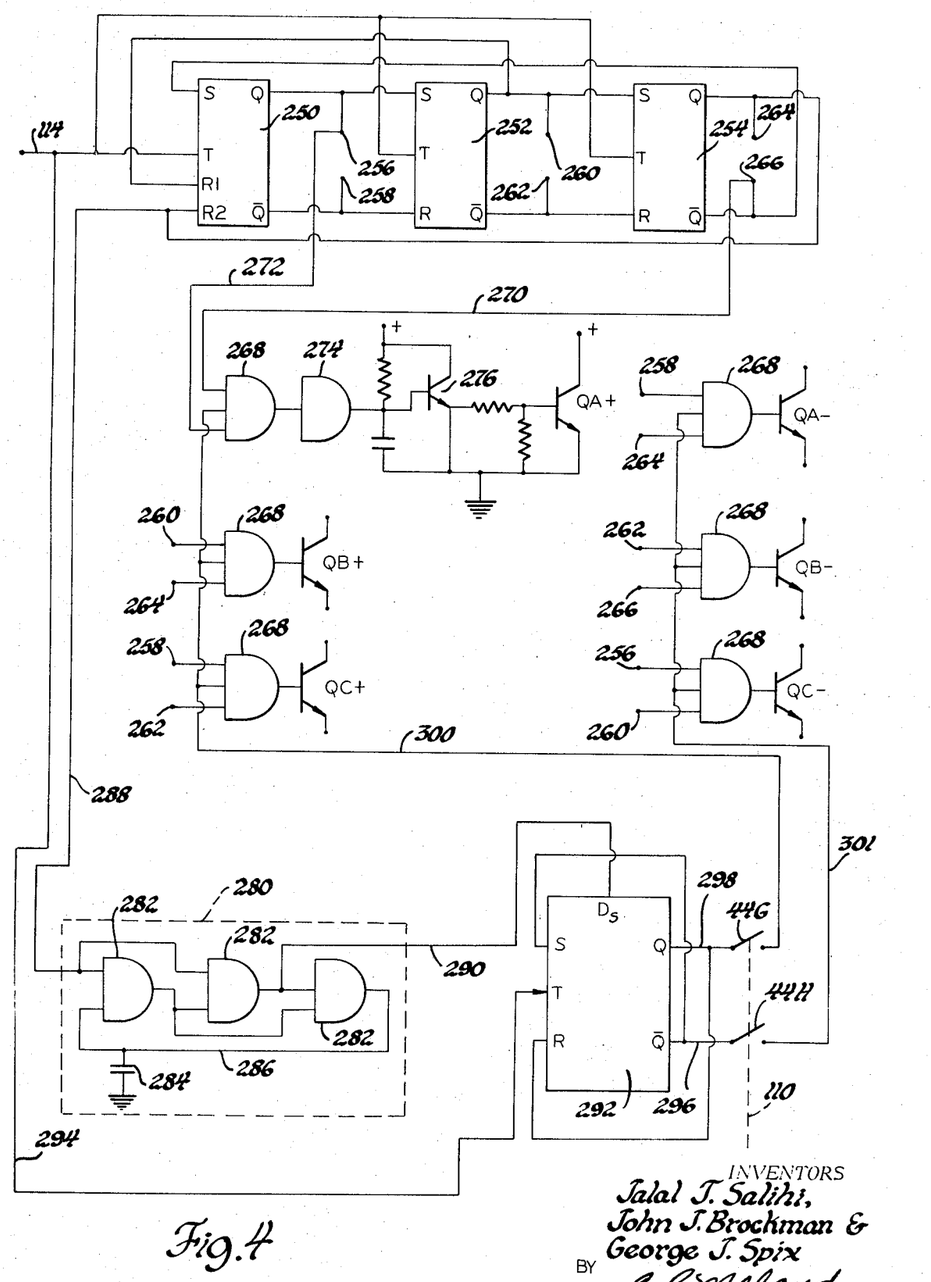
FIG. 4 is a logic circuit diagram illustrating the logic for controlling the firing of the controlled rectifier converter shown in FIG. 2.

The relay coil 44 is connected in series with a source of direct current 102 and a switch 104 which is mechanically coupled to a manually operable brake controller which is illustrated as a brake pedal designated by reference numeral 106. The switch 104 is normally open but when the brake pedal 106 is depressed a predetermined amount, the switch 104 is closed to energize the relay coil 44. When relay coil 44 is energized, the switch contacts 44A, 44B and 44C are closed to connect the braking resistors across the phase windings of the motor. In addition, when relay coil 44 is energized the contact 44D is moved from its position contacting contact 44E to a position engaging fixed contact 44F. This means that when the brake pedal is depressed the negative voltage $F_b$ at contact 44F will be combined with the positive voltage $F_m$ by adder-subtractor 79. On the other hand, when the brake pedal 106 is fully released and switch 104 is open the contact 44D engages contact 44E to provide motoring operation. The relay coil 44 further operates contacts in a gate firing control circuit designated by reference numeral 107. These contacts are illustrated in FIG. 4 where they are designated by reference numerals 44G and 44H. The dotted line 110 shown in FIG. 1 and in FIG. 4 indicates that these contacts are operated by the energization of relay coil 44. As will be more fully described hereinafter, the relay switches 44G and 44H are closed whenever the brake pedal 106 is depressed in order to reduce the conduction angle of the controlled rectifiers of converter 24.

The voltage on conductor 82 will be the sum of $F_m + F_s$ or will be equal to the difference $F_m - F_b$, depending upon whether or not the brake pedal 106 is depressed. The voltage on conductor 82 is a direct voltage and is applied to a conventional voltage-to-frequency converter designated by reference numeral 112. The output of the voltage-to-frequency converter 112 is a series of pulses applied to line 114 which have a frequency that is a function of the direct voltage appearing on conductor 82. When motoring operation is being utilized the frequency of the pulses on conductor 114 will be a function of $F_m + F_s$. On the other hand, when the braking programmer 74 is supplying the conductor 82 the frequency of the voltage pulses on conductor 114 will be a function of $F_m - F_b$. The pulses on conductor 114 are applied to a gate firing control circuit designated by reference numeral 107 and this control circuit is illustrated in detail in FIG. 4.

The output of the gate firing control circuit 107 is applied to a conductor 115 which is connected to the controlled rectifier converter 24. As will be more fully described hereinafter, the output of the gate firing control circuit 107 is a series of pulses which sequentially gate groups of controlled rectifiers conductive at a frequency determined by the pulse rate applied to conductor 114. This frequency, as is more fully described hereinafter, is determined by whether or not the induction motor is operating in a motoring or power mode or in a braking mode where a negative slip frequency condition exists.

The brake pedal 106 is connected with a variable resistor designated by reference numeral 116. This variable resistor 116 is connected with a field current control device designated by reference numeral 118 which may take the form of a conventional voltage regulator which adjusts the field current supplied to the field winding 14 as a function of the amount of depression of the brake pedal 106.

The voltage regulator 118 senses the output voltage of alternator 12 by means of transformer 119 and bridge rectifier 121 which applies a direct voltage to regulator 118 that is a function of the magnitude of the output voltage of generator 12. This voltage is compared with a voltage set by the position of resistor 116 with the result that the output voltage of the alternator is regulated to a value determined by the setting of variable resistor 116. Thus, as the brake pedal 106 is depressed the field current applied to the field winding 14 is regulated to increase the output voltage of the alternator 12 and therefore increase the output power of the alternator 12. The field current control device 118 will maintain the output voltage of the alternator 12 at a predetermined value which is determined by the amount of depression of the brake pedal 106. As will be more fully described hereinafter, this preset voltage determines the amount of braking that takes place in the induction motor 38 when the induction motor is operated in its braking mode.

Figures 2, 3:
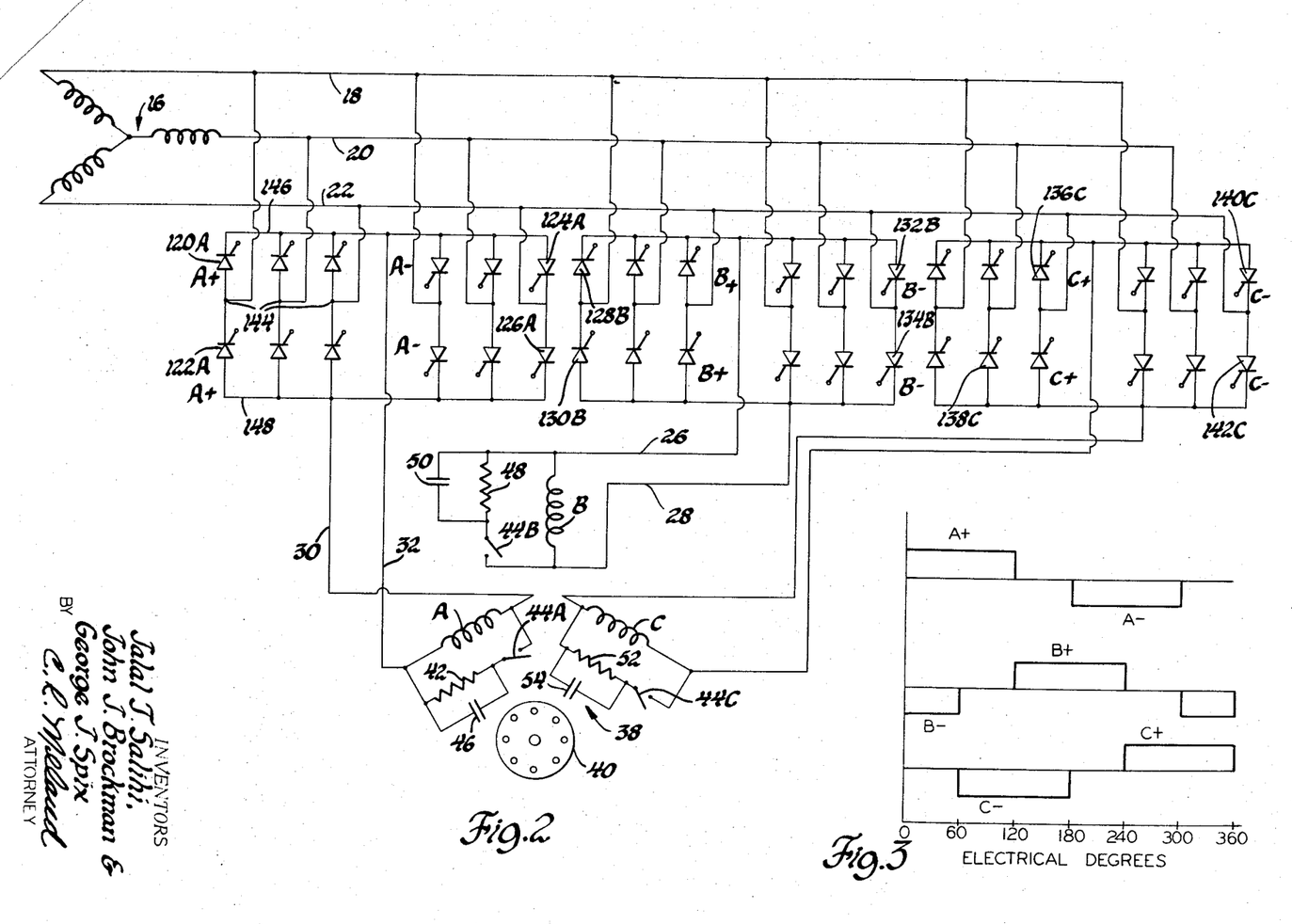
FIG. 2 is a schematic circuit diagram of the converter shown in block diagram form in FIG. 1.
FIG. 3 is a voltage waveform timing diagram illustrating the periods of time in which the phase windings of the induction motor of this invention are energized.

Referring now more particularly to FIG. 2, a schematic circuit diagram is illustrated of the converter which is designated by reference numeral 24 in FIG. 1. In FIG. 2 certain parts of the system that have been illustrated in FIG. 1 are repeated and these parts have been identified with the same reference numerals as were used in FIG. 1. The converter 24, as previously described, comprises 36 controlled rectifiers which are illustrated in FIG. 2. These controlled rectifiers are connected in six three-phase full-wave bridge rectifier networks to supply substantially square wave alternating voltages to the phase windings A, B and C of the induction motor 38. These controlled rectifiers are designated in groups of three by reference numerals 120A, 122A, 124A, 126A, 128B, 130B, 132B, 134B, 136C, 138C, 140C and 142C. Considering controlled rectifiers 120A and 122A it will be appreciated that these controlled rectifiers are connected in a three-phase full-wave bridge rectifier network having AC input terminals designated by reference numeral 144 which are connected respectively with the power supply conductors 18, 20 and 22. The output terminals of this three-phase full-wave bridge rectifier network have been designated by reference numerals 146 and 148 and it is seen that these direct current output terminals are connected with conductors 30 and 32 which feed the phase winding A of the induction motor 38. It therefore will be appreciated that when gate signals are simultaneously applied to the gate electrodes of controlled rectifiers 120A and 122A, a full-wave bridge rectifier circuit is provided which provides a positive voltage on conductor 32 and a negative voltage on conductor 30. This voltage is designated by the letter A+ in FIG. 3 which indicates the time in which the controlled rectifiers that supply the A+ voltage, namely, controlled rectifiers 120A and 122A are biased conductive to apply a positive voltage to the phase winding A. It is noted that this voltage extends for 120 electrical degrees and this gate firing arrangement is provided by the logic system illustrated in FIG. 4 to be described hereinafter.

The negative voltage for phase winding A, and designated as A— in FIGS. 2 and 3, is provided whenever the control rectifiers 124A and 126A are simultaneously gated conductive. This will provide a direct voltage to phase winding A which is positive on conductor 30 and negative on conductor 32 and this is shown as a negative voltage A— in FIG. 3 which occurs between 180 and 300 electrical degrees.

The groups of controlled rectifiers are gated conductive in accordance with the voltage timing curves illustrated in FIG. 3. Thus, it can be seen that from zero to 60 electrical degrees the control rectifiers 120A and 122A will be gated conductive to provide the first 60° of the A+ voltage shown in FIG. 3. At the same time, the B— voltage shown in FIG. 3 will be provided by gating controlled rectifiers 132B and 134B simultaneously conductive to energize the phase winding B of the induction motor 38. The remainder of the conduction periods for the groups of controlled rectifiers shown in FIG. 2 will be readily apparent from an inspection of the voltage curves illustrated in FIG. 3. The voltage curves of FIG. 3 illustrate the voltage applied to the phase windings A, B and C of the induction motor 38 and these are shown as square waves. It will be appreciated by those skilled in the art, however, that these voltages will depart from an exact square wave due to ripple provided by the three-phase full-wave rectifier networks.

It should be appreciated by those skilled in the art that the gating arrangement shown in FIG. 3 for the controlled rectifiers shown in FIG. 2 is a nonsynchronized system in that the controlled rectifiers are gated conductive without regard to the instantaneous phase relationship of the voltages developed by the output winding 16 of the alternator. It will be further appreciated by those skilled in the art that by this nonsynchronized triggering arrangement it is not possible for the induction motor 38, when operating at a negative slip frequency as an induction generator, to supply power to the power lines 18, 20 and 22 through converter 24. It also should be pointed out that the converter 24 is a frequency changer in that it will supply a square wave alternating output voltage to the phase windings of the motor 38 the frequency of which is a function of the repetition rate of the pulses applied to conductor 114 shown in FIG. 1. This means that the output frequency of converter 24 will be different from its input frequency. This repetition rate can provide either a positive controlled slip frequency for the induction motor or a negative slip frequency for braking as is more fully described hereinafter.

Referring now more particularly to FIG. 4, the gate firing control or logic system designated by reference numeral 107 will now be described, it being understood that the circuitry shown in FIG. 4 represents the block 107 shown in FIG. 1. In FIG. 4 the reference numeral 114 again designates a conductor which has a series of pulses applied thereto which is determined by the output of the voltage-to-frequency converter 112 shown in FIG. 1. The three-phase logic system shown in FIG. 4 includes a flip-flop which is designated by reference numeral 250. The flip-flop 250 has terminals designated by the letters S, T, R1, R2, $\overline{Q}$ and Q, which represent set, trigger, reset terminals and output terminals for the flip-flop. The flip-flop 250 together with flip-flops 252 and 254 form a conventional ring counter when they are electrically connected, as shown in FIG. 4. It is seen that the flip-flops 252 and 254 have terminals designated by letters S, T, R, $\overline{Q}$ and Q. These flip-flops are known to those skilled in the art and further description of these flip-flops is therefore considered unnecessary. It is seen that the pulses on conductor 114 are applied to the trigger terminal T of the flip-flop 250. It is further seen that the conductor connecting the terminals Q and S of the flip-flops 250 and 252 is connected with a terminal 256. In a similar fashion the conductors connecting the terminals $\overline{Q}$ and R of flip-flops 250 and 252 are connected with a junction 258. Similar connections between the flip-flops are connected with the terminals 260, 262, 264 and 266. By the connection of the flip-flops 250, 252 and 254 shown in FIG. 4, voltages are developed at junctions 256, 260 and 264 which are depicted in the timing chart of FIG. 5. Voltages which are developed at junctions 258, 262 and 266 are of the same duration or pulse width as those developed respectively at junctions 256, 260 and 264 but of an opposite polarity.

From an inspection of FIG. 4 it can be seen that the junction 266 is connected by conductor 270 with one of the inputs of a three-input NAND gate designated by reference numeral 268. The terminal 256 of the ring counter is connected with another input of the NAND gate 268 by a conductor 272. The output of the NAND gate 268 is applied to the input of a single input NAND gate (inverter) designated by reference numeral 274. The output of NAND gate 274 is applied to the base of an NPN transistor designated by reference numeral 276. The emitter of transistor 276 is coupled to the base of another NPN transistor which is designated as QA+. The conduction period of transistor QA+ is illustrated in the timing diagram of FIG. 5 and during motoring operation of the induction motor this conduction period will be 120°. The output voltage developed when transistor QA+ is conductive is utilized to simultaneously gate controlled rectifiers 120A and 122A conductive. This voltage can be coupled to the gate electrodes of the just mentioned controlled rectifiers by a transformer in a manner which is fully disclosed in patent application Ser. No. 57,143, filed on July 22, 1970 in the name of Jalal T. Salihi et al. and assigned to the assignee of this invention and now U.S. Pat. No. 3,611,104. It is pointed out that the conduction period of transistor QA+ will be 120° during normal power or motor operation of the induction motor 38 but this conduction angle is reduced to 60° when the relay operated switches 44G and 44H are closed as will be more fully described hereinafter. The 60° conduction period for transistor QA+ is also illustrated in the FIG. 5 timing chart.

It is seen in FIG. 4 that there are five other three input NAND gates which are identical with the NAND gate 268 and each of these NAND gates has been designated by the same reference numeral. The remaining NAND gates have pairs of input terminals which have been designated by the same reference numerals as used for the outputs of the flip-flops 250, 252 and 254. It is to be understood that the input terminals of the NAND gates 268 of these circuits are connected with the output terminals designated by like reference numerals of the flip-flops of the shift register by conductors which are not illustrated. The output transistors of each of these circuits or the remaining five circuits have been designated by letters QB+, QC+, QA−, QB− and QC−, it being understood that these transistors respectively control the switching of like designated groups of controlled rectifiers of converter 24. It is seen in FIG. 4 that the trigger circuit for the five remaining transistors is not completely illustrated in that it eliminates the NAND gate 274 and the intermediate transistor but it is to be understood that the output of each NAND gate 268 is coupled to a respective transistor by the same circuit that couples the NAND gate 268 and the transistor QA+. It is to be further understood that the remaining five transistors are coupled to the groups of controlled rectifiers by circuitry of the type shown in the above mentioned copending patent application Ser. No. 57,143.

Figure 5:
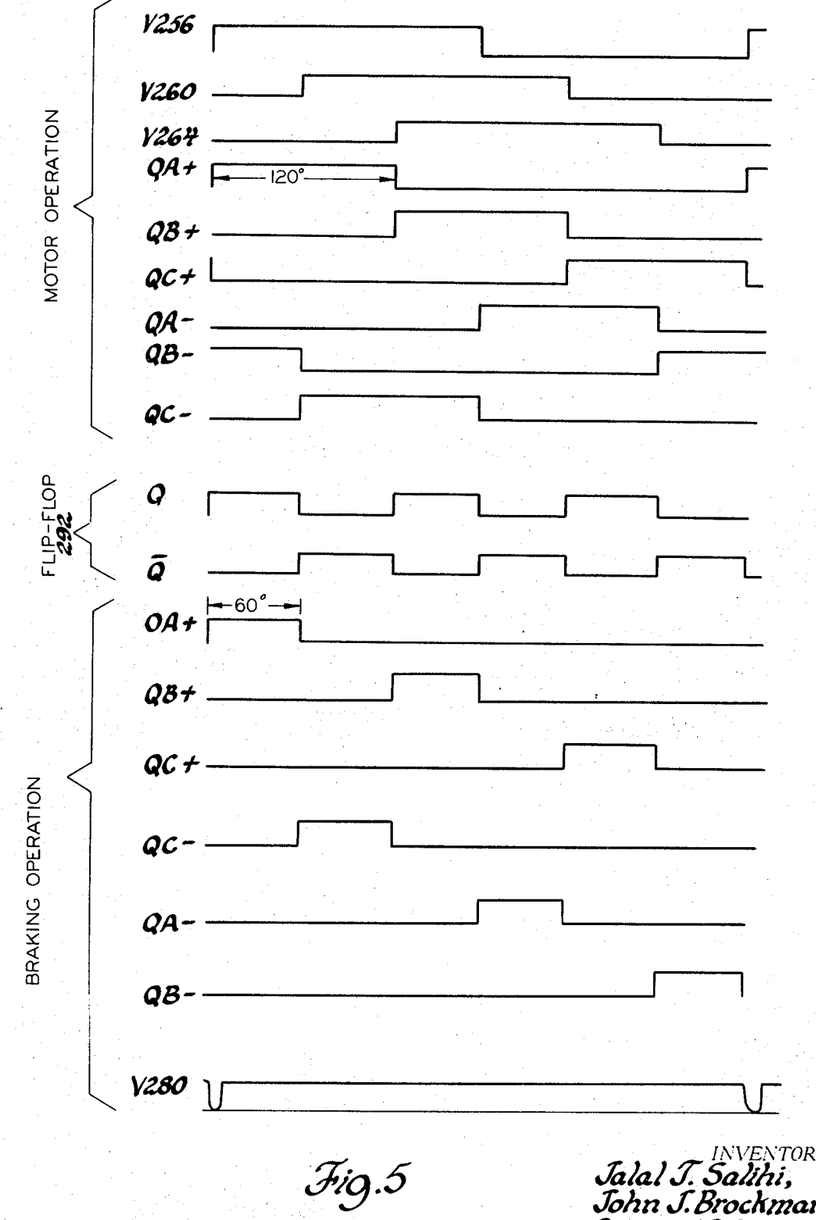
FIG. 5 illustrates voltage waveforms showing the various voltages and their timed relationship developed by the logic system shown in FIG. 4.

As long as the relay control switches 44G and 44H are in their open position, as shown in FIG. 4, the groups of controlled rectifiers of the converter 24 will be gated conductive for 120° conduction periods for motor operation, as is illustrated in FIG. 5. When the brake pedal 106 is depressed, however, the relay coil 44 is energized and the contacts 44G and 44H controlled thereby and as shown in FIG. 4 are moved from an open position to a closed position. This reduces the conduction angle of the various controlled rectifiers of converter 24 to 60° as is depicted in FIG. 5 of the timing diagram identified as braking operation.

In order to accomplish this result, the system of FIG. 4 includes a pulse control circuit which is generally designated by reference numeral 280. The control circuit 280 is comprised of three identical NAND gates, each of which is designated by reference numeral 282. The NAND gates 282 are connected in a manner shown in FIG. 4 with a capacitor 284 connected between conductor 286 and ground.

The input to control circuit 280 is formed by a conductor 288 which is connected with the R2 terminal of flip-flop 250. The output of the control circuit 280 is by way of conductor 290 which is connected with the $D_s$ terminal of a flip-flop designated by reference numeral 292. The flip-flop 292 is a 60° flip-flop and has terminals designated as $D_s$, S, T, R, Q and $\overline{Q}$. The $D_s$ terminal of the flip-flop 292 may be termed a direct set terminal and the flip-flop 292 can be of any well known commercially available type and may be, for example, a Fairchild U6A994851 flip-flop. It is seen that the trigger terminal T of the flip-flop 292 is coupled to the conductor 114 via a conductor 294. It therefore will be apparent that the trigger pulses from the voltage-to-frequency converter 112 shown in FIG. 1 are applied to the trigger terminal T of the flip-flop 292. The set terminal S and $\overline{Q}$ terminal of the flip-flop 292 are connected with a conductor 296 which in turn is connected to one side of the relay operated switch 44H. It is further seen that the reset terminal R and the Q terminal of the flip-flop 292 are connected with a conductor 298 which in turn is connected to one side of the relay operated switch 44G. The voltages across the output terminals Q and $\overline{Q}$ of flip-flop 292 are shown in FIG. 5. The opposite side of the relay operated switch 44G is connected to a conductor 300 which goes to respective input terminals of three NAND gates 268 the other three NAND gates being fed by conductor 301.

When the relay operated switches 44G and 44H are closed as when the brake pedal 106 is operated to close switch 104 shown in FIG. 1 the transistors QA+, QB+, QC+, QA−, QB−, and QC− will be gated conductive for periods of time illustrated in FIG. 5 denoted by the legend braking operation. It can be seen as compared to motor operation that the conduction angle of the groups of controlled rectifiers has been reduced from a 120° to 60°. This has been found to provide at least two advantages in operation of the braking system. First of all, by reducing the conduction angle to 60° the power supplied by the generator during braking is reduced. In addition, it has been discovered that the likelihood of false triggering of the groups of controlled rectifiers that make up the converter 24 is reduced when the conduction angle is reduced to substantially 60° during braking of the induction motor.

The voltage V280 shown in FIG. 5 is the output voltage from the control circuit 280 shown in FIG. 4 which is applied to conductor 290. This voltage provides synchronization for the system and synchronization occurs when the voltage drops to zero, as shown in the waveform of FIG. 5.

Figure 6:
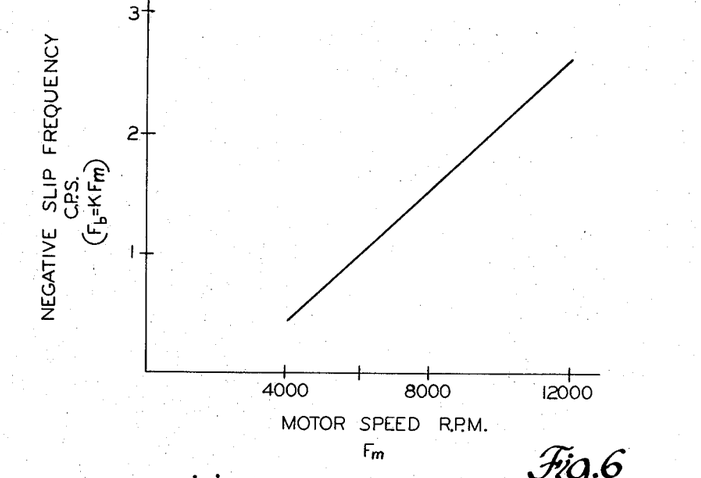
FIG. 6 is a curve of motor speed versus negative slip frequency provided by the system of this invention during braking of the induction motor.

Referring now more particularly to FIGS. 1 and 6, a description will now be made of the braking programmer 74 for programming the negative slip frequency of the induction motor during a braking mode of operation. The braking programmer 74 can take the form of an operational amplifier which receives a direct voltage of a magnitude $F_m$ at its input terminals and develops an output voltage $F_b$ which varies linearly with the speed of rotation of the rotor 40 of induction motor. This output voltage has been designated as $F_b$ in FIG. 1 and this voltage can be stated as equal to a constant K multiplied by $F_m$ or in other words equal to K $F_m$. This voltage $F_b$ is illustrated in FIG. 6 where the relationship between motor speed $F_m$ and voltage $F_b$ are shown in graphical form. It is seen from FIG. 6 that when the induction motor is operating at approximately 6,000 rpm the negative slip frequency will be approximately 1 cycle per second. The braking programmer 74 which, as stated above, could be an operational amplifier provides the proper voltage relationship between the motor speed signal $F_m$ and the negative slip frequency signal $F_b$ which is equal to K $F_m$. It is seen from FIG. 6 that as the motor speed increases the negative slip frequency increases in a substantially linear fashion and the negative slip frequency which is utilized during braking of the induction motor will therefore vary linearly with motor speed by the system that has been described.

With this arrangement that has been described and during the braking mode of operation of the induction motor the output frequency of the converter 24 will be a function of $F_m - F_b$. This of course means that the frequency of the input voltage to the induction motor from the converter 34 is less than a related frequency of the speed of rotation of the rotor 40 by the amount of negative slip frequency $F_b$. This further means that the induction motor 38 will now operate in a regenerative mode or as an induction generator since its input frequency is less than a frequency related to the speed of rotation of the rotor 40. This further means that induction motor 38 is now operating in a braking mode to slow down the rotor and the wheels 56 and 58 of the vehicle. It should be appreciated that the magnitude of the negative slip frequency signal is determined by the instantaneous speed of rotation of the rotor 40 of the induction motor as is depicted in FIG. 6.

Figure 7:
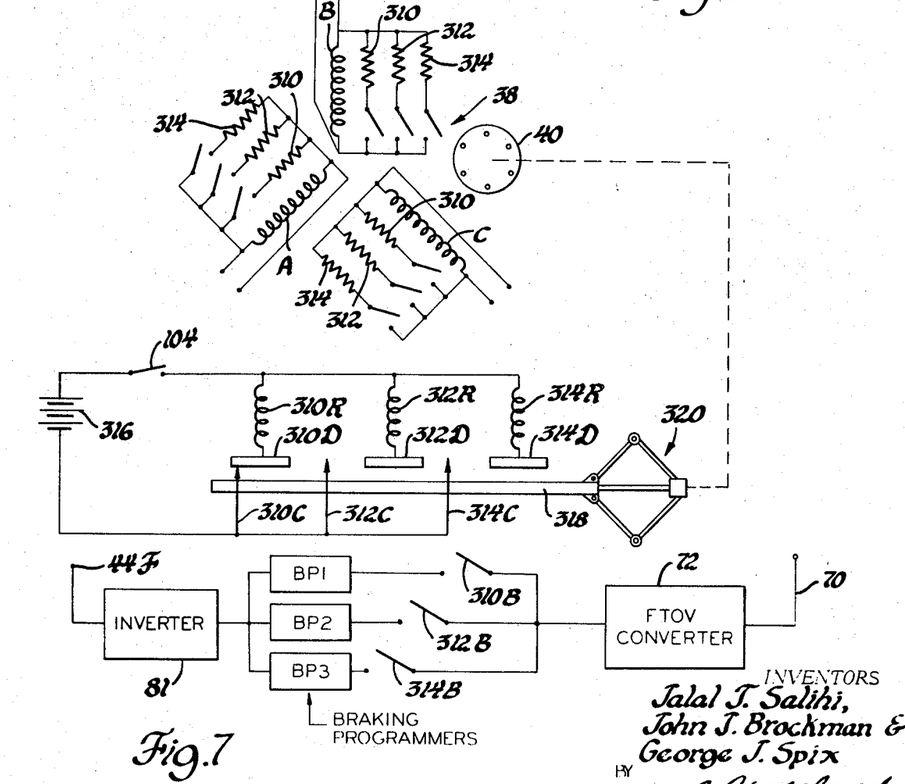
FIG. 7 is a schematic circuit diagram of a braking system made in accordance with this invention where different value resistors are used in the braking system and wherein the system switches in various braking programming circuits for each value of resistance used in braking the induction motor.

Referring now more particularly to FIG. 7, a system is illustrated which is capable of inserting different valued resistors across the respective phase windings of the induction motor 38 during different speed ranges of the rotor of the induction motor 38. The reason for the use of such system is that it has been discovered that more efficient braking can be achieved with the system of this invention where different resistors are used over different predetermined speed ranges of the induction motor 38. Thus, in the system of FIG. 1 resistors 42, 48 and 52 may be, for example, 2.8 ohm resistors where the induction motor is to be braked over a speed range of 4,000 to 12,000 rpm as shown in FIG. 6. Where it is desired to use different valued resistors for braking during different speed ranges of the motor the system of FIG. 7 can be utilized. FIG. 7 illustrates only a portion of FIG. 1 and the same reference numerals have been used as were used in FIG. 1 to identify the same parts in each figure.

It is seen in FIG. 7 that the phase windings of the induction motor 38 again are designated by the letters A, B and C. It is further seen that the phase windings are respectively connected in parallel with three resistors which have been designated by reference numerals 310, 312 and 314. These resistors can be paralleled by capacitors (not illustrated) as in FIG. 1. In the arrangement described the resistors 310 have the same resistance value as do the resistors 312 and the resistors 314. The resistance values of resistors 310, 312 and 314 are all different however and each is tailored to provide optimum braking during one of three speed ranges of the induction motor 38.

In FIG. 7 each resistor is shown connected in series with a relay operated switch which is not identified by a reference numeral. The contacts located respectively in series with the resistors 310 are controlled by a relay coil designated as 310R in FIG. 7. In a similar fashion the contacts connected in series with resistors 312 are controlled by relay coil 312R and the contacts in series with resistors 314 are controlled by relay coil 314R. All of the relay contacts for controlling the paralleling of the resistors with the phase winding are open except when a respective relay coil is energized. For example, when relay coil 310R is energized the resistors 310 will each be connected respectively in parallel with a respective phase winding by a closure of an associated relay contact.

Each of the relay coils 310R, 312R and 314R are connected to one side of a source of direct current 316 through switch 104. The opposite side of the source of direct current is connected with movable electrical contacts 310C, 312C and 314C. These contacts are mounted on a movable shaft 318 which is moved by a flyweight mechanism designated by reference numeral 320 and mechanically coupled to the rotor 40 of the induction motor 38. The contacts 310C, 312C and 314C slidably engage fixed contacts 310D, 312D and 314D. With the arrangement shown in FIG. 7 it will be appreciated that as the movable contacts 310C–314C are shifted by the centrifugal mechanism 320 one of the movable contacts will respectively engage a fixed contact over a predetermined speed range of the motor 40. Thus, as shown in FIG. 7, relay coil 310R will be energized for as long as the movable contact 310C is in engagement with the fixed contact 310D. As the shaft 318 is moved by the centrifugal mechanism the contact 310C will eventually leave fixed contact 310D and another movable contact for example contact 312C will engage fixed contact 312D. The arrangement is such that one relay coil is energized over a given speed range and in the system shown in FIG. 7 each of the three relay coils will be energized at different times for three different speed ranges of the motor 38.

The relay coils 310R, 312R and 314R also respectively control relay contacts 310B, 312B and 314B. Thus when relay coil 310R is energized it not only connects resistors 310 in parallel with the respective phase windings of the induction motor but also closes the relay contact 310B. The relay contact 310B is connected in series with a braking programmer designated as BP1. The braking programmer BP1 determines the negative slip frequency of the system and performs the same function as the braking programmer 74 shown in FIG. 1 and will develop some output voltage which relates motor speed and negative slip frequency as shown in FIG. 6.

It is seen that relay contact 312B is connected in series with another braking programmer BP2 and that relay contact 314B is connected with still another braking programmer BP3. The braking programmers BP1, BP2 and BP3 may all be arranged such that they develop different slopes for the relationship between motor speed and negative slip frequency for a given value of braking resistance which has been connected in parallel with a given phase winding of the motor. It therefore will be appreciated that by use of the system shown in FIG. 7 a particular resistance value will be placed in parallel with a given phase winding of the induction motor to provide regenerative braking and the particular resistance that is selected will be determined by the instantaneous output speed of the induction motor 38. In addition, it can be seen that when a particular resistance is paralleled with a given phase winding one of the switches 310B, 312B or 314B is closed to provide the desired slip frequency characteristic for the given resistance which is now being used for braking. The braking programmers BP1, BP2 and BP3 provide linear output characteristics like that shown in FIG. 6 but have different motor speed-slip frequency functions for a given speed range of the induction motor 38.

The operation of the motor control system of this invention will now be described. Assuming first of all that the operator of the vehicle is operating the vehicle in a motoring mode a voltage is applied to the phase windings A, B and C of the induction motor 38. During motoring the vehicle is controlled by an accelerator control designated by reference numeral 320. This control is connected with voltage regulator 118 by line 322 and with converter 24 by line 324. During motoring the accelerator control adjusts the output voltage of generator 12 and the duty cycle of the controlled rectifiers of converter 24 to control the voltage applied to the motor. Since the brake pedal 106 is not depressed the relay contactor 44D will be in its closed position shown in FIG. 1. This means that the slip frequency of the induction motor 38 will be controlled by the summation of two direct voltages $F_m + F_s$ which are added in adder-subtractor 79 shown in FIG. 1. Since the converter 24 will now be gated at a frequency which is a function of $F_m + F_s$ the motor 38 will operate at a constant slip frequency $F_s$ determined by the motoring programmer 76 shown in FIG. 1.

Assuming now that the operator of the vehicle desires to slow the vehicle down by braking the vehicle, the operator depresses the brake pedal 106. When the brake pedal 106 is depressed the relay coil 44 is energized to shift contact 44D into engagement with contact 44F. In addition the contacts 44A, 44B and 44C will all be closed to connect the braking resistors 42, 48 and 52 in parallel with the respective phase windings of the motor 38. The movement of the brake pedal 106 performs one other function in that it causes the closure of relay contacts 44G and 44H, shown in FIG. 4, and this as previously described reduces the conduction angle of the controlled rectifiers in converter 24 from 120° to 60°.

When contact 44D moves from contact 44E to contact 44F the motor 38 is changed from a positive slip frequency mode of operation to a negative slip frequency mode of operation. This means that the converter 24 is now gated at such a frequency that the frequency of the voltage applied to the phase windings of the motor 38 is less than a frequency related to the rotational speed of rotor 40 with a result that the induction motor 38 now operates as an induction generator in a regenerative mode. During the time that the motor is operating with a negative slip frequency this negative slip frequency will be determined by the instantaneous rotational speed of the rotor 40 of the induction motor by a relationship illustrated in FIG. 6. Thus, as motor speed is increased the negative slip frequency is increased in a substantially linear fashion.

With the motor operating at a negative slip frequency voltages are generated in the phase windings A, B and C and currents are respectively supplied to the braking resistors 42, 48 and 52. The amount of current flowing in the braking resistors will depend upon the instantaneous negative slip frequency of the induction motor 38 and the output voltage of the converter 24. This output voltage is regulated by the voltage regulator 118 which in turn is controlled by variable resistor 116. This means that during braking the voltage output of alternator 12 and therefore the output voltage of converter 24 is related to the amount the brake pedal 106 is depressed. This voltage is further held at a constant value for a given setting of resistor 116 by the voltage regulator 118. Therefore as the brake pedal 106 is moved further in a depressed or braking direction the output voltage of the alternator is increased but held at a constant value determined by the position of the brake pedal 106.

One of the principal objects of this invention is to provide substantially constant horsepower braking for a given position of the brake pedal 106 and to provide an efficient arrangement where the least amount of power is supplied from the generator 12 to the braking resistances 42, 48 and 52 during the braking mode of operation. In order to effectuate these objects the effective resistance of the induction motor 38 is varied linearly by varying its negative slip frequency as shown in FIG. 6.

The effective resistance of an induction motor can be expressed approximately as $R = R_2(fs/fm)$ where $fs$ is the slip frequency, $fm$ is the equivalent motor shaft frequency and $R_2$ is the rotor resistance referred to the stator.

Since this is true its effective resistance can be maintained substantially constant by varying the negative slip frequency of the induction motor 38 as a function of motor speed, as shown in FIG. 6. This results in the effective resistance of the induction motor as viewed from its stator side substantially matching the resistance of the braking resistors 42, 48 and 52. In other words, the effective resistance of, for example, the stator winding B of the induction motor is matched to the resistance of braking resistor 48 during the braking mode of operation by continuously varying the negative slip frequency of the motor as shown in FIG. 6. This results in optimum and efficient braking for the induction motor and results in a system where minimum power is taken from the generator 12 during the braking operation and further results in a system where substantially constant horsepower braking is achieved over a given speed range of the induction motor 48. A factor in this constant horsepower braking, of course, is the fact that the output voltage of the generator 12 is made substantially constant by the voltage regulator device 118 during the braking mode of operation. The braking power is proportional to the square of the generator voltage.

With the arrangement of FIG. 7, of course, different valued resistors are connected in parallel with the respective phase windings of the motor for different speed ranges of the motor and the negative slip frequency is again programmed according to a predetermined program to vary this negative slip frequency in a manner similar to that shown in FIG. 6 but with different braking programmers or braking programs for each value of resistance utilized when the motor 38 is operating as an induction generator.

The motoring slip frequency programmer 76 may take the form of an operational amplifier or a function generator to provide the voltage $F_s$, which as disclosed herein, is a function of motor speed $F_m$. The motoring slip frequency programmer may, however, have no relationship to motor speed and could respond to other operating parameters of the system. Moreover, the motoring programmer may be arranged to provide the same output voltage for all motor speeds in which case the motor will operate at a constant slip frequency for all motor speeds.

It should be pointed out with reference to the modification of FIG. 7 that relay coils 310R, 312R and 314R will not be energized until switch 104 is closed and this switch is only closed when brake pedal 106 is depressed. Moreover, the system of FIG. 7 can include another relay coil (not illustrated) which closes contacts 44G and 44H when switch 104 is closed.

What is claimed is:

1. An induction motor control system for braking an induction motor comprising, an induction motor having a winding and a rotor, a source of alternating current, converter means connected between said source of alternating current and said motor winding for applying an alternating current to said motor winding at a frequency determined by the switching frequency of said converter means, said converter means capable of supplying current from said source of alternating current to said motor winding but operating in such a switching sequence as to prevent said motor winding from supplying current to said source of alternating current, at least one braking resistor, switching means for connecting said braking resistor in parallel with said winding of said motor, negative slip frequency control means connected with said converter means and responsive to the speed of rotation of the rotor of said induction motor for causing said induction motor to operate with a predetermined negative slip frequency when said negative slip frequency control means is actuated, braking control means connected with said switching means and with said negative slip frequency control means, said braking control means when actuated operating said negative slip frequency control means to cause said motor to operate at a negative slip frequency while causing said switching means to connect said braking resistor across said output winding of said motor, and means responsive to the speed of rotation of said rotor for causing the negative slip frequency of said motor to vary substantially linearly with changes in rotor speed, said variation being such that said negative slip frequency decreases as motor speed decreases.

2. A motor control system for a polyphase induction motor comprising, an induction motor having a polyphase winding and a rotor, a source of alternating current, a converter including a plurality of switching devices connected between said source of alternating current and said winding of said motor, triggering means connected with said switching devices of said converter for triggering said switching devices at a predetermined frequency whereby the frequency of the output voltage of said converter which is applied to said motor winding can be controlled, said triggering means controlling said converter such that current is supplied to said motor winding from said source of alternating current while preventing current flow in a direction from said motor winding toward said source of alternating current, a plurality of braking resistors, means including switching means for selectively connecting a respective braking resistor in parallel with a respective phase winding of said motor, a negative slip frequency control means including means for sensing the speed of rotation of a rotor of said induction motor for causing said converter to operate at such a frequency that said induction motor operates at a predetermined negative slip frequency as an induction generator, braking control means, means coupling said braking control means to said switching means and to said negative slip control means whereby said braking resistors are connected in parallel with said phase windings of said motor and said motor is operated in a negative slip frequency condition when said braking control device is actuated, means responsive to the speed of rotation of said motor for varying the negative slip frequency of said motor substantially linearly with changes in speed of said motor when said motor is operating in said braking mode, and means controlled by said braking control means for regulating the output voltage of said source of alternating current when said motor is operating in a braking mode.

3. A motor control system for a polyphase induction motor comprising, a polyphase induction motor having a polyphase winding and a rotor, a source of alternating current, converter means connected between said source of alternating current and said phase windings of said motor, said converter means comprised of a plurality of groups of controlled rectifiers, triggering means coupled to said groups of controlled rectifiers for causing said groups of controlled rectifiers to switch in a predetermined sequence to thereby apply a substantially square wave alternating voltage to said polyphase winding of said induction motor at a frequency determined by the switching frequency of said triggering means, said triggering means switching said controlled rectifiers such that power cannot be returned to said source of alternating current from said motor, a plurality of braking resistors one for each phase winding of said motor, means including switching means for selectively connecting a braking resistor in parallel with a given phase winding of said motor, brake control means, means coupling said brake control means with said switching means whereby said switching means is closed to connect a respective braking resistor in parallel with a respective phase winding of said motor when said brake control means is actuated, a negative slip frequency control means responsive to the speed of rotation of said motor and coupled to said triggering means for controlling the output frequency of said converter means, said negative slip frequency control means including means for triggering said converter at such a frequency relative to the rotating speed of the rotor of said motor that said motor operates with a negative slip frequency as an induction generator, means coupling said brake control means with said negative slip frequency control means whereby said negative slip frequency control means is put into operation when said brake control means is actuated, and means for causing the negative slip frequency of said induction motor to vary substantially linearly with changes in rotor speed of said motor over a predetermined speed range of said motor including means for sensing the speed of rotation of said rotor.

4. The motor control system according to claim 3 where each braking resistor is paralleled by a capacitor.

5. A motor control system for an induction motor comprising, an induction motor having a winding and a rotor, a source of alternating current, frequency control means connected between said source of alternating current and said winding of said motor, said frequency control means including a plurality of switching devices, triggering means connected with said switching devices for determining the frequency of occurrence and pulse width of the output voltage pulses applied to said motor winding from said frequency control device, braking resistor means, means including a switching means for connecting said braking resistor means in parallel with said winding of said motor, negative slip frequency control means coupled to said triggering means and responsive to the speed of rotation of the rotor of said motor, said negative slip frequency control means operative to regulate the switching frequency of said switching devices of said frequency control means such that said induction motor operates as with a negative slip frequency in a braking mode when said negative slip frequency control means is actuated, angle control means for determining the pulse width of the output voltage pulses applied to said motor winding from said frequency control device, a braking control device, and means coupling said braking control device with said switching means, with said negative slip frequency control means and with said angle control means, said braking control device when actuated causing said switching means to connect said braking resistor in parallel with said output winding, actuating said negative slip frequency control means to operate said motor with a negative slip frequency and actuating said angle control means to reduce the pulse width of the voltage pulses applied to said motor winding.

6. The motor control system according to claim 5 where means are provided for controlling the output voltage of said source of alternating current and wherein said control means is regulated in response to actuation of said braking control device.

7. A motor control system for an induction motor having a polyphase winding and a rotor comprising, a source of alternating current, converter means connected between said source of alternating current and said polyphase winding of said motor, said converter means including a plurality of switching devices, a triggering means connected with said switching devices for causing said switching devices to be triggered conductive in a predetermined sequence and at a predetermined frequency to thereby supply a polyphase alternating current to said polyphase motor winding at a predetermined frequency, positive slip frequency control means connectible with said triggering means and responsive to the speed of rotation of the rotor of said motor, said positive slip frequency control means when actuated operating to cause said converter means to have an output frequency such that said motor is operated at a predetermined constant positive slip frequency, negative slip frequency control means connectible to said triggering means and responsive to the speed of rotation of said rotor for causing the output frequency of said converter to be of such a value relative to the rotational speed of said motor that said induction motor operates at a negative slip frequency in a braking mode, a braking resistor for each phase winding of said polyphase motor winding, braking switching means operable to selectively connect a given braking resistor in parallel with a respective phase winding of said motor, brake control means, means coupled to said brake control means for connecting said negative slip frequency control means with said trigger means and disconnecting said positive slip frequency control means from said trigger means when said brake control means is actuated, means coupling said brake control means and said braking switching means whereby said braking resistors are connected in parallel with said phase windings of said motor when said brake control means is actuated, and means for causing the negative slip frequency of said negative slip frequency control means to increase substantially linearly with increase in rotor speed, said last named means including means for detecting the instantaneous speed of rotation of said motor rotor.

8. A motor control system for an induction motor having a polyphase winding and a rotor comprising, a source of alternating current, frequency control means connected between said source of alternating current and said polyphase motor winding for controlling the frequency of the voltage applied to said motor winding, first control means coupled to said frequency control means for causing said motor to operate with a substantially constant positive slip frequency, second control means coupled to said frequency control means for causing said motor to operate with a negative slip frequency in a braking mode, said second control means including means for causing the negative slip frequency to vary as a function of motor speed, said first and second control means including means sensing the speed of rotation of the rotor of said motor, braking resistor means for each phase winding of said motor, switching means for selectively connecting a respective braking resistor in parallel with a respective phase winding of said motor, brake control means for causing said switching means to connect said resistors respectively in parallel with said phase windings of said motor and causing said second control means to control the operation of said motor, means for varying the resistance value of said braking resistor means as a function of the speed of rotation of the rotor of said motor, and means for changing the functional relationship between motor speed and negative slip frequency of said second control means in response to motor speed whereby the resistance value of said braking resistor means and negative slip frequency have a predetermined relationship.

9. A motor control system for a polyphase induction motor comprising, an induction motor having a polyphase winding and a rotor, a source of polyphase alternating current, an alternating current to alternating current converter means connected between said source of alternating current and said polyphase motor winding including a plurality of polyphase full-wave bridge rectifiers comprised of controlled rectifiers, triggering means coupled to said controlled rectifiers for causing said controlled rectifiers to switch at a predetermined frequency to thereby apply a substantially square wave alternating voltage to said polyphase winding of said motor, positive slip frequency control means connectible with said triggering means and responsive to the speed of rotation of said rotor for causing said converter to switch at such a frequency that said motor is operated with a substantially constant positive slip frequency, negative slip frequency control means connectible with said triggering means and responsive to the speed of rotation of said rotor for causing said converter to switch at such a frequency related to rotor speed that said motor is operated with a negative slip frequency in a braking mode, braking resistors connectible respectively in parallel with a respective phase winding of said motor winding, braking control means, means responsive to the actuation of said braking control means for causing said resistors to be connected in parallel with said phase windings of said motor and for causing said converter to be controlled by said negative slip frequency control means, and means for causing the negative slip frequency of said motor to increase substantially linearly with increasing rotor speed of said motor when said system is operating in said braking mode.

10. A vehicle propulsion system for a vehicle having at least one driving wheel comprising, a prime mover, a polyphase alternating current generator driven by said prime mover, a polyphase induction motor having a polyphase winding and a rotor, means mechanically connecting the rotor of said induction motor with said driving wheel, an alternating current to alternating current converter means connected between said output winding of said alternating current generator and said polyphase winding of said motor, said converter means including a plurality of controlled rectifiers connected in a plurality of polyphase fullwave bridge rectifier networks, triggering means coupled with said controlled rectifiers for causing said controlled rectifiers to switch at a predetermined frequency whereby a substantially square wave alternating voltage is applied to said motor winding from the output of said converter means, positive slip frequency control means coupled to said triggering means and responsive to rotor speed for causing said converter to operate at such a frequency that said motor operates with a substantially regulated positive slip frequency, negative slip frequency control means responsive to the speed of rotation of said rotor coupled to said triggering means for causing said converter to operate at such a frequency relative to the speed of said rotor that said induction motor is operated with a regulated negative slip frequency to provide a braking mode of operation, braking resistors connectible respectively in parallel with a respective phase winding of said motor, manually operable braking control means, means coupling said braking control means to said switching means and to said positive and negative slip frequency control means such that said negative slip frequency control means provides the frequency control for said motor when said braking control means is actuated, said braking control means causing said switching means to connect said resistors respectively in parallel with the phase windings of said motor, and means responsive to the speed of rotation of said rotor for increasing the negative slip frequency of said motor substantially linearly with increasing speed of said rotor.

* * * * *